(12) United States Patent
Chen et al.

(10) Patent No.: US 11,904,412 B2
(45) Date of Patent: Feb. 20, 2024

(54) PRODUCTION LINE OF H-SHAPED STEEL AND PRODUCTION METHOD

(71) Applicant: CHINA CONSTRUCTION SCIENCE AND INDUSTRY CORPORATION LTD., Guangdong (CN)

(72) Inventors: Zhenming Chen, Guangdong (CN); Qingchuan Feng, Guangdong (CN); Dongrong Xie, Guangdong (CN); Zhizhen Lv, Guangdong (CN); Zhiyong Zuo, Guangdong (CN); Shitao Huang, Guangdong (CN); Chengli Xie, Guangdong (CN)

(73) Assignee: CHINA CONSTRUCTION SCIENCE AND INDUSTRY CORPORATION LTD., Guangdong (CN)

( * ) Notice: Subject to any disclaimer, the term of this patent is extended or adjusted under 35 U.S.C. 154(b) by 665 days.

(21) Appl. No.: 17/253,892

(22) PCT Filed: Jul. 31, 2020

(86) PCT No.: PCT/CN2020/106398
§ 371 (c)(1),
(2) Date: Dec. 18, 2020

(87) PCT Pub. No.: WO2021/103636
PCT Pub. Date: Jun. 3, 2021

(65) Prior Publication Data
US 2021/0370446 A1 Dec. 2, 2021

(30) Foreign Application Priority Data

Nov. 26, 2019 (CN) .......................... 201911170319.8

(51) Int. Cl.
*B23K 31/02* (2006.01)
*B23K 37/047* (2006.01)

(52) U.S. Cl.
CPC .......... *B23K 31/022* (2013.01); *B23K 37/047* (2013.01)

(58) Field of Classification Search
CPC .... B23K 31/022; B23K 37/047; B23K 11/11; B23K 2101/28; B23K 31/02; B23K 37/00
See application file for complete search history.

(56) References Cited

FOREIGN PATENT DOCUMENTS

| CN | 102837140 A | 12/2012 |
|---|---|---|
| CN | 206200560 U | 5/2017 |

(Continued)

OTHER PUBLICATIONS

ISA/CN, International Search Report for corresponding PCT Patent Application No. PCT/CN2020/106398, dated Oct. 20, 2020, 2 pages.

(Continued)

*Primary Examiner* — John P. Dulka
(74) *Attorney, Agent, or Firm* — NK Patent Law (57) ABSTRACT

The present disclosure relates to the technical field of production of H-shaped steel and discloses a production line of H-shaped steel and a production method. By arrangement of the assembly zone in which a welding line is arranged and the welding zone in which a welding line is arranged, a process layout of assembly and welding flow type machining production line can be formed. Assembly and welding of a stiffening plate are operated independently, and a carrying robot, a spot welding robot and a welding robot are movable between stations. A transfer device transfers an H-shaped workpiece in the process of feeding, machining and discharging, thereby implementing flow type machining, which can effectively improve machining efficiency. Through the production method, the assembly and welding flow type machining of the stiffening plate can be implemented, thereby effectively improving machining efficiency.

13 Claims, 4 Drawing Sheets

(56) References Cited

FOREIGN PATENT DOCUMENTS

| | | | |
|---|---|---|---|
| CN | 108568583 A | 9/2018 | |
| CN | 110280934 A | 9/2019 | |
| CN | 110900027 A | 3/2020 | |
| JP | H0857688 A | 3/1996 | |
| KR | 101555190 B1 * | 11/2014 | ............ B21D 47/01 |

OTHER PUBLICATIONS

ISA/CN, Written Opinion for corresponding PCT Patent Application No. PCT/CN2020/106398, dated Oct. 20, 2020, 7 pages.

* cited by examiner

PRODUCTION LINE OF H-SHAPED STEEL AND PRODUCTION METHOD

CROSS-REFERENCE TO RELATED APPLICATIONS

This application is a national stage filing under 35 U.S.C. § 371 of international application number PCT/CN2020/106398, filed Jul. 31, 2020, which claims priority to Chinese patent application No. 201911170319.8 filed Nov. 26, 2019. The contents of these applications are incorporated herein by reference in their entirety.

FIELD

The present disclosure relates to the technical field of steel structure manufacturing, and in particular, to a production line of H-shaped steel and a production method

BACKGROUND

Stiffening plates are welded at both sides of an H-shaped workpiece to form H-shaped steel with the stiffening plates, which can enhance the strength of the H-shaped steel. In the building steel structure manufacturing industry, the H-shaped workpiece is often welded manually, the production efficiency is very low, and the production quality is greatly affected by human factors. Therefore, a robot and a positioner cooperate in welding in some technologies, the position of an H-shaped workpiece is adjusted through the positioner, and automatic welding is performed by the robot. However, all weld seams are finished by flat welding or horizontal welding, and the process of feeding and discharging and clamping the workpiece is complicated. As a result, the robot needs to wait during the displacement process, which affects production efficiency.

SUMMARY

The present disclosure solves at least one of the technical problems in related technologies. Therefore, the present disclosure provides a production line of H-shaped steel, which can improve production efficiency in assembly and welding of a stiffening plate to an H-shaped steel.

The present disclosure further provides a production method based on the production line of H-shaped steel.

In a first aspect, an embodiment of the present disclosure provides a production line of H-shaped steel, including:

a temporary storage zone for placing an H-shaped workpiece to be machined;

an assembly zone provided with an assembly line, wherein the assembly line is provided with a spot welding robot and a carrying robot, and the spot welding robot and the carrying robot are movable along the assembly line; the carrying robot is configured to feed a stiffening plate to an H-shaped steel beam on the assembly line, and the spot welding robot is configured to position and fix the stiffening plate on the H-shaped workpiece;

a welding zone provided with a welding line, wherein the welding line is provided with several welding robots for welding the stiffening plate and the H-shaped workpiece, and the welding robots are movable along the welding line; and a transfer device comprising a material taking portion and a bearing portion, wherein the material taking portion is configured to take and place the H-shaped workpiece; and the material taking portion is borne by the bearing portion and is movable among the temporary storage zone, the assembly zone and the welding zone.

The production line of H-shaped steel according to the embodiment of the present disclosure has at least the following beneficial effects.

By arrangement of the assembly zone in which a welding line is arranged and the welding zone in which a welding line is arranged, a process layout of assembly and welding flow type machining production line can be formed. Assembly and welding of a stiffening plate are operated independently, and a carrying robot, a spot welding robot and a welding robot are movable between stations. A transfer device transfers an H-shaped workpiece in the process of feeding, machining and discharging, thereby implementing flow type machining, which can effectively improve machining efficiency.

In some embodiments, the bearing portion comprises a support frame, the material taking portion comprises a lifting device, the assembly line and the welding line both extend in a first direction, the support frame extends in a second direction perpendicular to the first direction and is movable in the first direction, and the lifting device is arranged on the support frame and is movable in the second direction.

In some embodiments, the welding zone is arranged at one end of the assembly zone in the first direction; and the temporary storage zone is arranged beside the assembly zone in the second direction.

In some embodiments, a stiffening plate feeding device is provided at the other end of the assembly zone, and the stiffening plate feeding device is configured to move the stiffening plate to a feeding station at which the stiffening plate is fed by the carrying robot to the H-shaped workpiece to be machined on the assembly line.

In some embodiments, the assembly line is provided with the spot welding robot at both sides of the assembly line respectively; and/or the welding line is provided with the welding robot at both sides of the welding line respectively.

In some embodiments, at least one of the assembly line and the welding line is provided with an anti-falling device for fixing the H-shaped workpiece; the anti-falling device comprises an adjusting component and a pair of pressing components, both ends of the adjusting component extend in the second direction, and the pressing components are separately arranged at both ends of the adjusting component, the adjusting component is configured to adjust a distance between the pressing components in the second direction, the pressing components each comprise an abutting piece configured to abut against a web of the H-shaped workpiece.

In some embodiments, the welding zone comprises two welding lines arranged in parallel.

In some embodiments, the lifting device comprises a lifting appliance for taking and placing the H-shaped workpiece, the lifting appliance comprises lifting hooks and a lifting hook horizontal shifter, and the lifting hook horizontal shifter is configured to adjust a distance between the lifting hooks.

In some embodiments, the lifting appliance further comprises a lifting hook presser, the lifting hook presser comprises an adjusting member and a pressing member, and a longitudinal distance between the pressing member and the lifting hook is adjustable by the adjusting member.

In a second aspect, an embodiment of the present disclosure provides a production method of H-shaped steel based on the production line of H-shaped steel as described above, which is used to fixedly weld stiffening plates at several specified positions on an H-shaped workpiece, wherein the method comprises:

S1: actuating a transfer device to move the H-shaped workpiece from a temporary storage zone to an assembly line of an assembly zone, and actuating an anti-falling device on the assembly line to fix the H-shaped workpiece;

S2: carrying a stiffening plate by a carrying robot to a specified station on the assembly line, attaching the stiffening plate to the H-shaped workpiece for a specified period of time, and performing spot welding and fixing of the stiffening plate and the H-shaped workpiece by a spot welding robot;

S3: executing step S2 until all required stiffening plates are assembled on the H-shaped workpiece on the assembly line;

S4: resetting the anti-falling device, actuating the transfer device to move the H-shaped workpiece assembled with the stiffening plate to a welding line, and then actuating an anti-falling device on the welding line to fix the H-shaped workpiece;

S5: welding the stiffening plate and the H-shaped workpiece by welding robots; S6: executing S5 until all stiffening plates on the welding line are welded and the required H-shaped steel is obtained; and S7: resetting the anti-falling device and actuating the transfer device to discharge the H-shaped steel from the welding line.

The production method based on the production line of H-shaped steel according to the embodiment of the present disclosure has at least the following beneficial effects.

Through the production method, the assembly and welding flow type machining of the stiffening plate can be implemented, thereby effectively improving machining efficiency.

In some embodiments, step S2 further comprising: moving the carrying robot and the spot welding robot separately to corresponding stations at both sides of the H-shaped workpiece to separately perform spot welding and fixing of stiffening plates at corresponding positions from both sides.

In some embodiments, step S5 further comprises: moving the welding robots separately move both sides of the corresponding stiffening plate of the H-shaped workpiece, so that the welding robots at the both sides sequentially perform horizontal welding, vertical welding and overhead welding from bottom to top.

In some embodiments, a storage container for storing the stiffening plate is provided, and the stiffening plate is distributed to a to-be-transported position through the storage container, so that the carrying robot can carry the stiffening plate in step S2.

DETAILED DESCRIPTION OF THE EMBODIMENTS

The concept and the technical effects of the present disclosure will be clearly and completely described below in conjunction with the embodiments to help fully understand objectives, features and effects of the present disclosure. Apparently, the described embodiments are only some embodiments of the present disclosure, and not all of the embodiments. Other embodiments obtained by a person of ordinary skill in the art based on the embodiments of the present disclosure without creative efforts shall fall within the protection scope of the present disclosure.

In the description of the embodiments of the present disclosure, if orientation description is involved, the orientation or position relationship indicated by, for example, "up" and "down" is based on the orientation or position relationship shown in the drawings, and these terms are just used to facilitate description of the present disclosure and simplify the description, but not to indicate or imply that the mentioned device or elements must have a specific orientation and must be established and operated in a specific orientation, and thus, these terms cannot be understood as a limitation to the present disclosure.

In the description of the embodiments of the present disclosure, if it is mentioned that a feature is "arranged" or "connected" to another feature, it can be directly arranged or connected to another feature, or indirectly arranged or connected to another feature. In the description of embodiments of the present disclosure, if "several" is involved, it means more than one; if "a plurality of" is involved, it means more than two, which should be both understood as excluding the number one or two; if "first" and "second" are involved, it should be understood as distinguishing technical features, but not as indicating or implying relative importance, implicitly indicating the number of indicated technical features or implicitly indicating the sequence relationship of indicated technical features.

Embodiment 1

Figure 1:
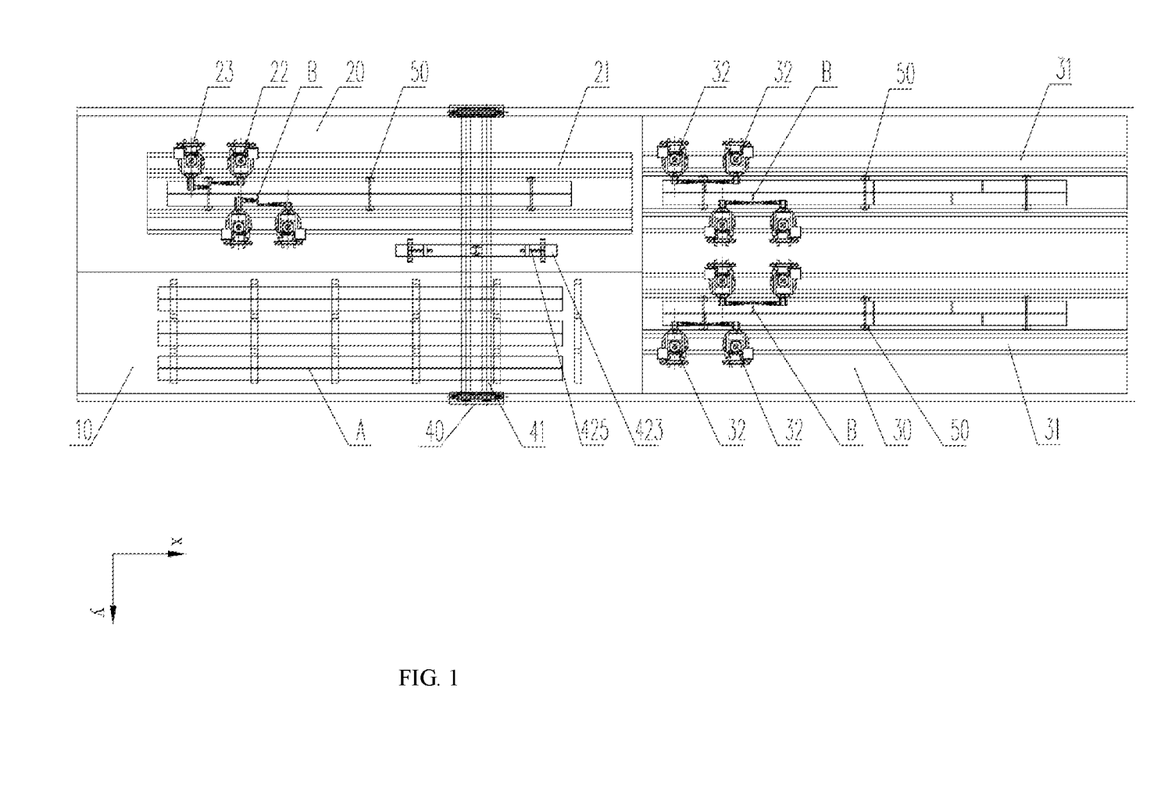
FIG. 1 is a top view of Embodiment 1 of a production line of H-shaped steel according to the present disclosure.
Figure 2:
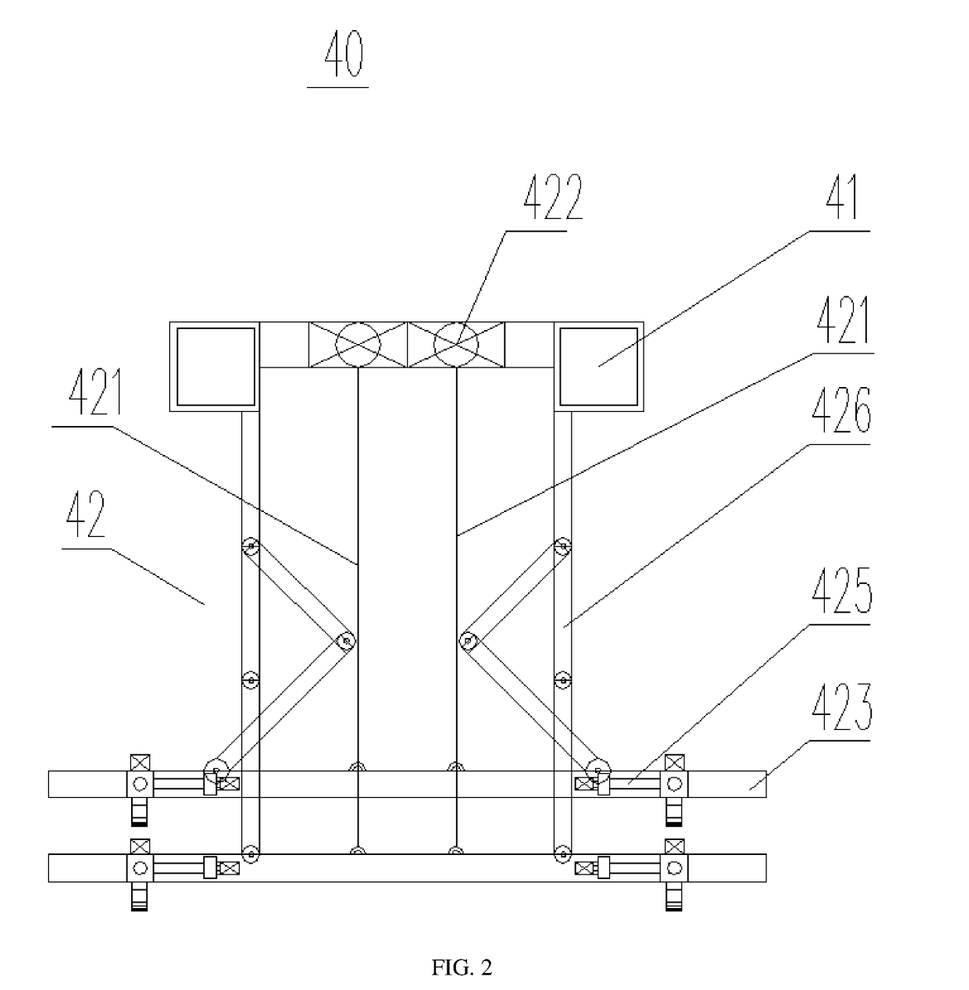
FIG. 2 is a schematic structural diagram of an embodiment of a transfer device in a production line of H-shaped steel according to the present disclosure.

FIG. 1 is a top view of Embodiment 1 of a production line of H-shaped steel according to the present disclosure; and FIG. 2 is a schematic structural diagram of an embodiment of a transfer device in a production line of H-shaped steel according to the present disclosure. Referring to FIGS. 1 and 2, the production line of H-shaped steel of this embodiment includes: a temporary storage zone 10, an assembly zone 20, a welding zone 30 and a transfer device 40. The transfer device 40 is configured to feed an H-shaped workpiece A from the temporary storage zone 10 to the assembly zone 20, transfer the H-shaped workpiece A from the assembly zone 20 to the welding zone 30, and discharge the H-shaped workpiece A from the welding zone 30.

The temporary storage zone 10 is configured to place an H-shaped workpiece A to be machined, and the H-shaped workpiece A stored in the temporary storage zone 10 can be fed to an assembly line 21 of the assembly zone 20 through the transfer device 40.

The assembly zone 20 is provided with the assembly line 21, and the assembly line 21 is provided with a spot welding robot 22 and a carrying robot 23. The carrying robot 23 is configured to feed a stiffening plate B to an H-shaped steel beam on the assembly line 21; and the carrying robot 23 can move along the assembly line 21, so that the stiffening plate B can be carried to each corresponding preset station. The spot welding robot 22 is configured to position and fix the stiffening plate B on the H-shaped workpiece A; and the spot welding robot 22 can move along the assembly line 21, so that the stiffening plate B carried to each station by the carrying robot 23 can be subjected to spot welding and positioning.

The welding zone 30 is provided with a welding line 31, the welding line 31 is provided with several welding robots 32 for welding the stiffening plate B and the H-shaped workpiece A, and the welding robots 32 can move along the welding line 31, so that the stiffening plate B subjected to spot welding and positioning through the assembly zone 20 can be welded and fixed.

The transfer device 40 includes a material taking portion and a bearing portion. The material taking portion is configured to take and place the H-shaped workpiece A; and the material taking portion is borne by the bearing portion and can move among the temporary storage zone 10, the assembly zone 20 and the welding zone 30. Specifically, the bearing portion includes a support frame 41, the material taking portion includes a lifting device 42, the assembly line 21 and the welding line 31 extend in a first direction, and the first direction refers to the x-axis of a reference coordinate in the figure; the support frame 41 extends in a second direction perpendicular to the first direction, and the second direction refers to the y-axis of the reference coordinate in the figure. The lifting device 42 is configured to take and place the H-shaped workpiece A and arranged on the support frame 41 and can move in the second direction, and the support frame 41 can move in the first direction, thereby implementing the feeding, transferring and discharging of the H-shaped workpiece A. The transfer device 40 may also directly use a conventional double-beam gantry lifting device, a cross beam spans above the assembly zone 20 and/or the welding zone 30 in the second direction, and the whole double-beam gantry lifting device can move in the first direction. The cross beam of the double-beam gantry lifting device is connected to a mechanical bridging 426, which is configured to lift a lifting appliance cross beam 423.

The lifting device 42 includes a rope 421, a hoist 422, the lifting appliance cross beam 423 and a lifting appliance 424. The lifting appliance cross beam 423 extends in the second direction, the rope 421 is connected to the lifting appliance cross beam 423, and the lifting appliance cross beam 423 is lifted by driving the rope 421 to lift. The rope 421 may be a steel wire rope, and the hoist 422 may be an electric hoist. One end of the steel wire rope is connected to the lifting appliance cross beam 423, the other end thereof is connected to the electric hoist, and the steel wire rope pulls the lifting appliance cross beam 423 to lift or descend through the winding or unwinding of the electric hoist. The lifting appliance 424 is mounted on the lifting appliance cross beam 423 and configured to take and place the H-shaped workpiece A, and the lifting appliance cross beam 423 is provided with a lifting appliance horizontal movement device 425, which can move the lifting appliance along the lifting appliance cross beam 423.

The welding zone 30 is arranged at one end of the assembly zone 20 in the first direction, and material transfer between the assembly zone 20 and the welding zone 30 can be implemented by moving the transfer device 40 in the first direction. The temporary storage zone 10 is arranged beside the assembly zone 20 in the second direction, and material transfer between the temporary storage zone 10 and the assembly zone 20 can be implemented by moving the lifting device on the support frame 41 in the second direction. This zone layout can form an assembly line machining technology layout suitable for H-shaped steel, which can not only save transfer time, but also reduce space occupation.

Because the welding takes a long time, in order to reduce the waiting time of a previous process, several welding lines 31 can be arranged in parallel in the welding zone 30, and each welding line 31 operates independently. The transfer device 40 moves in the first direction to implement material transfer between the assembly zone 20 and the welding zone 30, and the lifting device 42 on the transfer device 40 moves in the second direction to take a material from and place a material on each welding line 31 in the welding zone 30. In this embodiment, two welding lines 31 are provided. One of the welding lines 31 is on the same straight line as the assembly line 21 of the assembly zone 20. After taking a material in the assembly zone 20, the transfer device 40 can move in the first direction to transfer the material above the welding line 31, thereby reducing the transfer time.

The spot welding robot 22 is separately arranged at both sides of the assembly line 21; and/or the welding robot 32 is separately arranged at both sides of the welding line 31, which can improve production efficiency. Specifically, arrangement of the spot welding robot 22 separately at both sides of the assembly line 21 can simultaneously perform spot welding and positioning of the stiffening plates B at specified positions at both sides of the H-shaped workpiece A, thereby improving production efficiency. Similarly, arrangement of the welding robot 32 separately at both sides of the welding line 31 can simultaneously weld and fix the positioned stiffening plates B at both sides of the H-shaped workpiece A, thereby improving production efficiency.

In order to ensure stable mounting of the H-shaped workpiece A and improve machining stability, an anti-falling device 50 for fixing the H-shaped workpiece A is arranged on the assembly line 21 and/or the welding line 31 and is configured to clamp both sides of the H-shaped workpiece A. This prevents the case that the H-shaped workpiece A in the spot welding and/or welding process shakes or falls, which affects machining quality and machining efficiency. The anti-falling device 50 is fixedly arranged on the assembly line 21 and/or the welding line 31, and includes an adjusting component and a pair of pressing components, both ends of the adjusting component extend in the second direction, the pressing components are separately arranged at both ends of the adjusting component, and the adjusting component is configured for adjusting the distance between the pressing components in the second direction, and can be arranged as telescopic rod devices which are sleeved with each other and fixed by locking pins. The pressing components each include an abutting piece, and the abutting piece is configured to abut against a web of the H-shaped workpiece A. Certainly, the anti-falling device 50 may also be configured as other structures that can be used to clamp both sides of the H-shaped workpiece A, such as pneumatic clamping jaws.

Figure 3:
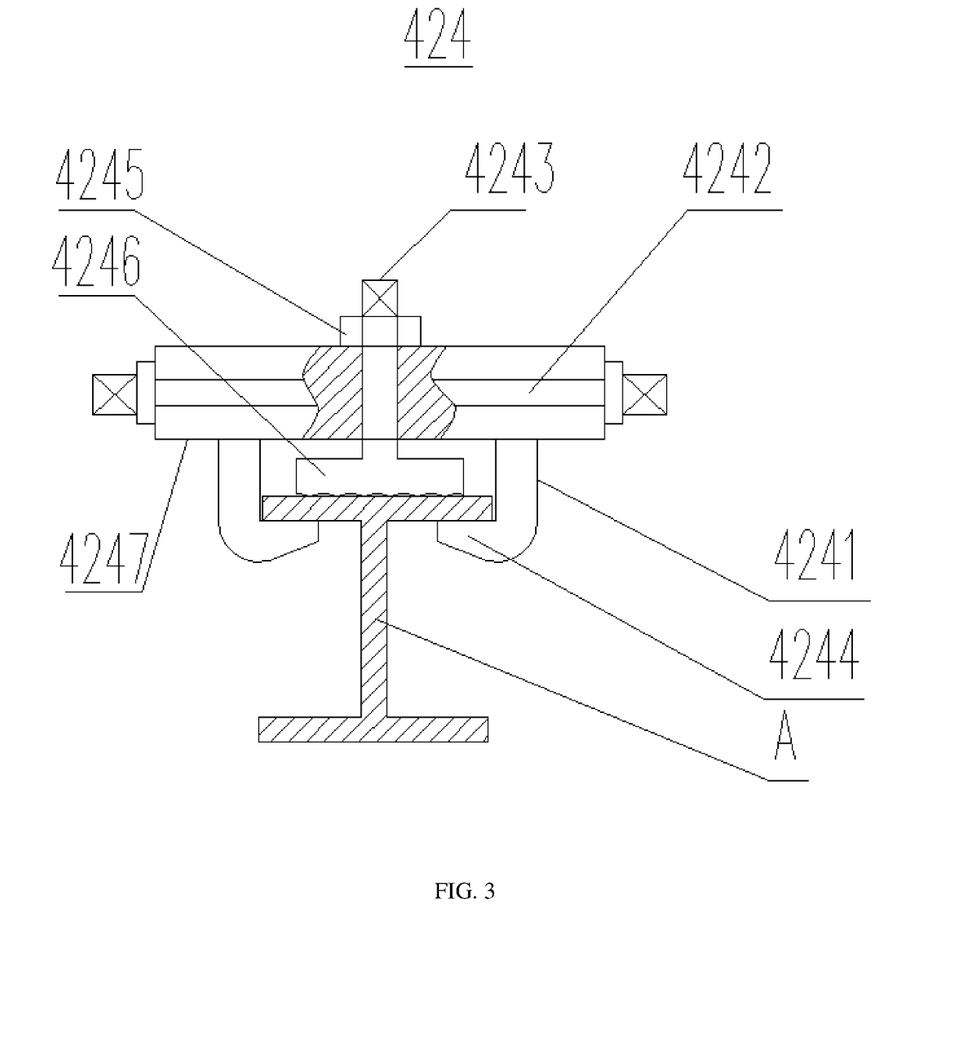
FIG. 3 is a schematic structural diagram of an embodiment of a lifting appliance of a production line of H-shaped steel according to the present disclosure.

FIG. 3 is a schematic structural diagram of an embodiment of a lifting appliance of a production line of H-shaped steel according to the present disclosure. Referring to FIG. 3, the lifting appliance 424 includes lifting hooks 4241, a lifting hook horizontal shifter 4242 and a lifting appliance base 4247. The lifting hooks 4241 are slidably mounted on the lifting appliance base 4247, so that the lifting hooks 4241 can be tightened or opened to take or place an H-shaped workpiece A. The lifting hooks 4241 are configured to grasp flanges at both sides of the H-shaped workpiece A. During grasping, the flanges at both sides of the H-shaped workpiece A are borne by hook portions of the lifting hooks 4241. The lifting hook horizontal shifter 4242 is configured to adjust the distance between the lifting hooks 4241 to tighten and open the lifting hooks 4241, so as to grasp or release the H-shaped workpiece A. In specific implementation, the lifting hooks can be horizontally moved by using a cylinder to push the lifting hooks. The lifting appliance 424 may also be provided with a hook presser 4243, the lifting hook presser 4243 includes an adjusting member 4245 and a pressing member 4246, and the adjusting member can adjust the longitudinal distance between the pressing member and the lifting hook 4241. Therefore, an upper portion of the flange of the H-shaped workpiece A grasped on the lifting hook 4241 can be pressed downwards, so as to keep the H-shaped workpiece A close to the hook portion 4244 of the lifting hook 4241, prevent the H-shaped workpiece A from shaking relative to the lifting hook 4241 and ensure the grasping stability of the lifting hook 4241. The pressing member 4246 may be provided with a screw and a pressure head. Correspondingly, the adjusting member is provided as a nut into which the screw can be threaded. The screw is threaded with the lifting appliance base 4247, and the pressure head is pressed down on the upper portion of the flange of the H-shaped steel workpiece through nut adjustment. A surface of the pressing member 4246 that is used for pressing the H-shaped steel workpiece is set to be non-planar, which contributes to the stability of pressing, for example, a corresponding texture structure may be set. Similarly, a surface of the lifting hook 4241 that is used for abutting against the H-shaped workpiece may also be set to be non-planar, so as to further improve the grasping stability of the lifting appliance.

The H-shaped workpiece A needs to be welded corresponding to the stiffening plate B and the lower flange, the web and the upper flange of the H-shaped workpiece A. For the manner in which a robot and a positioner cooperate in welding, all weld seams are finished by flat welding or horizontal welding during machining, so it is necessary to turn over the H-shaped workpiece A by the positioner and perform automatic welding by the robot; the process of feeding, discharging and clamping the workpiece is complicated. As a result, the robot needs to wait during the displacement process, which affects production efficiency. Moreover, assembly is required before welding, the assembly line type operation cannot be implemented, and the efficiency is low. The production line of H-shaped steel of this embodiment enables independent operation of assembly and welding, so that operation can be performed at a plurality of stations at the same time. A workpiece is transferred by the transfer device 40. The welding robots 32 sequentially complete horizontal welding, vertical welding and overhead welding. Multiple robots cooperate in welding, and the multi-position robot combination welding method of horizontal welding, vertical welding and overhead welding is used, such that the workpiece is fixed without turning over, and only one-time welding is required without waiting during the process, thereby reducing production time and improving production efficiency.

Embodiment 2

Figure 4:
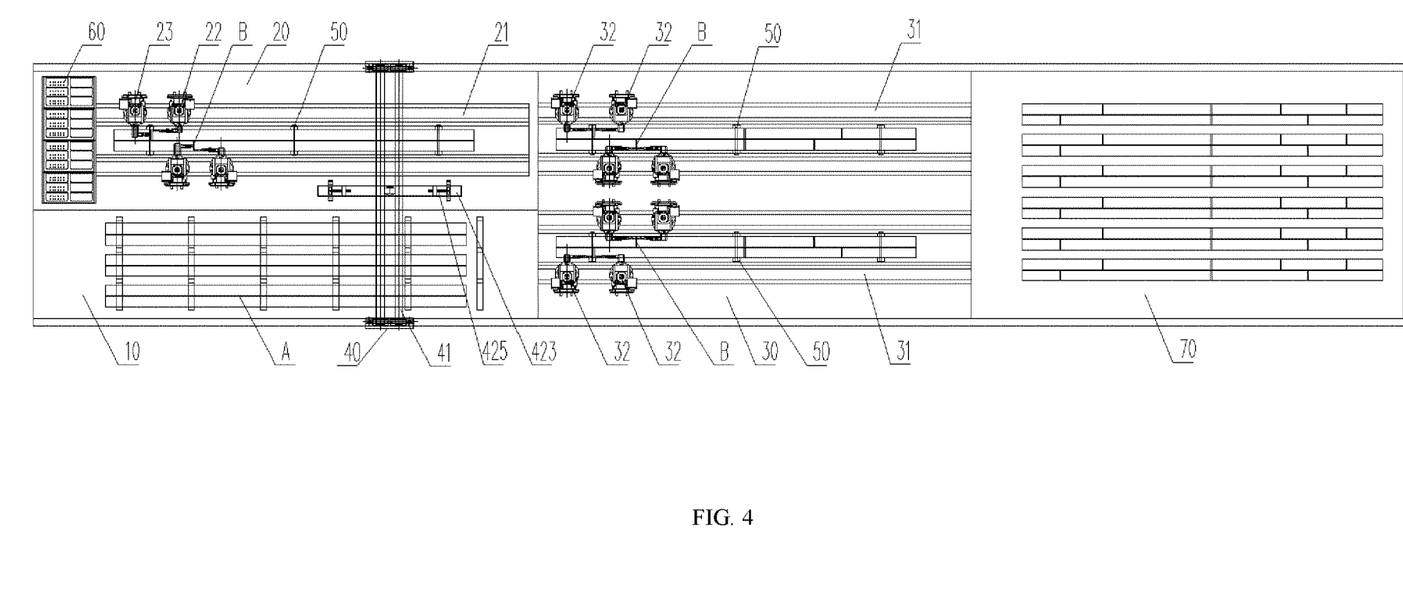
FIG. 4 is a top view of Embodiment 2 of a production line of H-shaped steel according to the present disclosure.

FIG. 4 is a top view of Embodiment 2 of a production line of H-shaped steel according to the present disclosure. Referring to FIG. 4, this embodiment is optimized on the basis of Embodiment 1. The other end of the assembly zone 20 opposite to the welding zone 30 is provided with a stiffening plate feeding device 60, and the stiffening plate feeding device 60 is configured to move a stiffening plate B to a feeding station, so that the carrying robot 23 feeds the stiffening plate B to an H-shaped workpiece A to be machined on the assembly line 21. The other side of the welding zone 30 opposite to the assembly zone 20 may further be provided with a finished product temporary storage zone 70, and H-shaped steel welded in the welding zone 30 is discharged to the finished product temporary storage zone 70 by the transfer device 40.

A production method of H-shaped steel based on the production line of H-shaped steel includes the following steps.

At step S1, a transfer device 40 is actuated to move an H-shaped workpiece A from a temporary storage zone 10 to an assembly line 21 of an assembly zone 20, and an anti-falling device 50 on the assembly line 21 is actuated to fix the H-shaped workpiece A.

At step S2, a stiffening plate B is carried by a carrying robot 23 to a specified station on the assembly line 21, attached to the H-shaped workpiece A for a specified period of time, and spot welding and fixing of the stiffening plate B and the H-shaped workpiece A are performed by a spot welding robot 22.

At step S3, step S2 is executed until all required stiffening plates B are assembled on the H-shaped workpiece A on the assembly line 21.

At step S4, the anti-falling device 50 is released and reset, the transfer device 40 is actuated to move the H-shaped workpiece A assembled with the stiffening plate B to a welding line 31, and then the anti-falling device 50 on the welding line 31 is actuated to fix the H-shaped workpiece A.

At step S5, the stiffening plate B and the H-shaped workpiece A are welded by welding robots 32.

At step S6, step S5 is executed until all stiffening plates B on the welding line 31 are welded and the required H-shaped steel is obtained.

At step S7, the anti-falling device 50 is released and reset, and the transfer device 40 is actuated to discharge the H-shaped steel from the welding line 31.

In the foregoing process, when S2 is executed, the carrying robot 23 and the spot welding robot 22 separately move to corresponding stations at both sides of the H-shaped workpiece A and separately perform spot welding and fixing of stiffening plates B at corresponding positions from both sides.

In the foregoing process, when S5 is executed, the welding robots 32 separately move to both sides of the corresponding stiffening plate B of the H-shaped workpiece A, so that the welding robots 32 sequentially perform horizontal welding, vertical welding and overhead welding corresponding to the stiffening plate B and a lower flange, a web and an upper flange of the H-shaped workpiece A from bottom to top.

A storage container for storing the stiffening plate B may be provided, and the stiffening plate B is distributed to a to-be-transported position through the storage container, so that the carrying robot 23 can carry the stiffening plate B at step S2.

Through the machining method of this embodiment, the multi-robot cooperative welding of the H-shaped workpiece A can be implemented, and the multi-position robot combination welding method of horizontal welding, vertical welding and overhead welding can be implemented. Compared with the conventional solution of cooperative welding of a robot and a positioner, the present disclosure reduces waiting time, and greatly improves production efficiency, so that the production capacity can be increased and the demand for mass production can be met.

Based on the foregoing structural settings of Embodiments 1 and 2 and the corresponding machining method, a production information system can be used as a top-level control system to collectively carry out multi-station and multi-process production management, and issue machining instructions and machining requirements to each working station, thereby implementing flow operations of feeding, assembly, transfer, welding and discharging; full automation of the multi-position welding process is implemented, and high-efficiency assembly and welding of a stiffening plate and an H-shaped workpiece are implemented. Moreover, workpiece identity information can be identified and obtained through a sensor, such that required parts can be automatically matched. The production information system controls a stiffening plate feeding device to distribute a to-be-assembled part to a to-be-transported position, and an assembly program is sent to the carrying robot, spot welding robot, welding robot, etc. to perform corresponding operations.

The preferred embodiments of the present disclosure have been described in detail above, but the present disclosure is not limited to the embodiments. Various equivalent modifications or substitutions can be made by those skilled in the art without departing from the principle of the present disclosure. These equivalent modifications or replacements shall fall within the scope defined by the claims of the present application. In addition, the embodiments of the present disclosure and features in the embodiments can be combined with each other provided that they do not conflict with each other.

What is claimed is:

1. A production line of H-shaped steel, comprising:
a temporary storage zone for placing an H-shaped workpiece to be machined;
an assembly zone provided with an assembly line, wherein the assembly line is provided with a spot welding robot and a carrying robot, and the spot welding robot and the carrying robot are movable along the assembly line; the carrying robot is configured to feed a stiffening plate to an H-shaped steel beam on the assembly line, and the spot welding robot is configured to position and fix the stiffening plate on the H-shaped workpiece;
a welding zone provided with a welding line, wherein the welding line is provided with several welding robots for welding the stiffening plate and the H-shaped workpiece, and the welding robots are movable along the welding line; and
a transfer device comprising a material taking portion and a bearing portion, wherein the material taking portion is configured to take and place the H-shaped workpiece; and the material taking portion is borne by the bearing portion and is movable among the temporary storage zone, the assembly zone and the welding zone.

2. The production line of H-shaped steel of claim 1, wherein the bearing portion comprises a support frame, the material taking portion comprises a lifting device, the assembly line and the welding line both extend in a first direction, the support frame extends in a second direction perpendicular to the first direction and is movable in the first direction, and the lifting device is arranged on the support frame and is movable in the second direction.

3. The production line of H-shaped steel of claim 2, wherein the welding zone is arranged at one end of the assembly zone in the first direction; and the temporary storage zone is arranged beside the assembly zone in the second direction.

4. The production line of H-shaped steel of claim 3, wherein a stiffening plate feeding device is provided at the other end of the assembly zone, and the stiffening plate feeding device is configured to move the stiffening plate to a feeding station at which the stiffening plate is fed by the carrying robot to the H-shaped workpiece to be machined on the assembly line.

5. The production line of H-shaped steel of claim 2, wherein at least one of the assembly line and the welding line is provided with an anti-falling device for fixing the H-shaped workpiece; the anti-falling device comprises an adjusting component and a pair of pressing components, both ends of the adjusting component extend in the second direction, and the pressing components are separately arranged at both ends of the adjusting component, the adjusting component is configured to adjust a distance between the pressing components in the second direction, the pressing components each comprise an abutting piece configured to abut against a web of the H-shaped workpiece.

6. The production line of H-shaped steel of claim 2, wherein the lifting device comprises a lifting appliance for taking and placing the H-shaped workpiece, the lifting appliance comprises lifting hooks and a lifting hook horizontal shifter, and the lifting hook horizontal shifter is configured to adjust a distance between the lifting hooks.

7. The production line of H-shaped steel of claim 6, wherein the lifting appliance further comprises a lifting hook presser, the lifting hook presser comprises an adjusting member and a pressing member, and a longitudinal distance between the pressing member and the lifting hook is adjustable by the adjusting member.

8. The production line of H-shaped steel of claim 1, wherein the assembly line is provided with the spot welding robot at both sides of the assembly line respectively; and/or the welding line is provided with the welding robot at both sides of the welding line respectively.

9. The production line of H-shaped steel of claim 8, wherein the welding zone comprises two welding lines arranged in parallel.

10. A production method of H-shaped steel based on the production line of H-shaped steel of claim 1, which is used to fixedly weld stiffening plates at several specified positions on an H-shaped workpiece, wherein the method comprises:
S1: actuating a transfer device to move the H-shaped workpiece from a temporary storage zone to an assembly line of an assembly zone, and actuating an anti-falling device on the assembly line to fix the H-shaped workpiece;
S2: carrying a stiffening plate by a carrying robot to a specified station on the assembly line, attaching the stiffening plate to the H-shaped workpiece for a specified period of time, and performing spot welding and fixing of the stiffening plate and the H-shaped workpiece by a spot welding robot;
S3: executing step S2 until all required stiffening plates are assembled on the H-shaped workpiece on the assembly line;
S4: resetting the anti-falling device, actuating the transfer device to move the H-shaped workpiece assembled with the stiffening plate to a welding line, and then actuating an anti-falling device on the welding line to fix the H-shaped workpiece;
S5: welding the stiffening plate and the H-shaped workpiece by welding robots;
S6: executing S5 until all stiffening plates on the welding line are welded and the required H-shaped steel is obtained; and S7: resetting the anti-falling device and actuating the transfer device to discharge the H-shaped steel from the welding line.

11. The production method of H-shaped steel of claim 10, wherein step S2 further comprising: moving the carrying robot and the spot welding robot separately to corresponding stations at both sides of the H-shaped workpiece to separately perform spot welding and fixing of stiffening plates at corresponding positions from both sides.

12. The production method of H-shaped steel of claim 10, wherein step S5 further comprises: moving the welding robots separately move both sides of the corresponding stiffening plate of the H-shaped workpiece, so that the welding robots at the both sides sequentially perform horizontal welding, vertical welding and overhead welding from bottom to top.

13. The production method of H-shaped steel of claim 10, wherein a storage container for storing the stiffening plate is provided, and the stiffening plate is distributed to a to-be-transported position through the storage container, so that the carrying robot can carry the stiffening plate in step S2.

* * * * *